United States Patent [19]

Chung et al.

[11] Patent Number: 5,490,931
[45] Date of Patent: Feb. 13, 1996

[54] FABRICATION OF A FLUOROPOLYMER HOLLOW FIBER HAVING A DEFECT-FREE SEPARATION LAYER

[75] Inventors: Tai-Shung Chung, Randolph; Edward R. Kafchinski, Winfield; Michael Haubs, Chatham, all of N.J.

[73] Assignee: Hoechst Celanese Corp., Somerville, N.J.

[21] Appl. No.: 170,650

[22] Filed: Dec. 17, 1993

Related U.S. Application Data

[63] Continuation of Ser. No. 840,374, Feb. 24, 1992, abandoned.
[51] Int. Cl.⁶ .................................................. B01D 69/08
[52] U.S. Cl. ........................... 210/500.23; 210/500.39; 264/41
[58] Field of Search ................... 210/500.23, 654, 210/640, 651, 500.39; 264/41, 49, 209.1

[56] References Cited

U.S. PATENT DOCUMENTS

| | | | |
|---|---|---|---|
| 4,666,607 | 5/1987 | Josefiak et al. | 210/500.23 X |
| 4,780,205 | 10/1988 | Murakami et al. | 210/500.23 X |
| 4,929,405 | 5/1990 | Kohn | 55/16 X |
| 5,055,116 | 10/1991 | Kohn et al. | 55/16 |
| 5,209,883 | 5/1993 | Chung et al. | 264/41 |

*Primary Examiner*—Frank Spear
*Attorney, Agent, or Firm*—Michael W. Ferrell

[57] ABSTRACT

Asymmetric fluoropolymer hollow fibers having a thin, dense, inner separation layer that is essentially defect-free. In the process of this invention, a fluoropolymer dope is spun into a hollow fiber using a hollow fiber die, a core solvent, preferably comprising water, and a coagulation bath, preferably comprising a water-acetone mixture. Due to solubility and surface tension differences, the outer layer of the fiber does not coagulate quickly enough to form a dense layer, and remains porous, but the core solvent causes the inner surface of the hollow fiber to coagulate into a thin, dense, defect-free layer.

3 Claims, 1 Drawing Sheet

FABRICATION OF A FLUOROPOLYMER HOLLOW FIBER HAVING A DEFECT-FREE SEPARATION LAYER

This is a continuation of application Ser. No. 07/840,374 filed on Feb. 24, 1992, now abandoned.

BACKGROUND OF THE INVENTION

This invention relates to the field of hollow fiber production, especially to hollow fibers for use in asymmetric fluid separation membranes.

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness and reduces wear and tear.

Highly porous membranes tend to be very permeable, but do a poor job of separating fluids into their components. Less porous, dense membranes can be more selective, but at the cost off reduced throughput.

Asymmetric membranes generally have a thin, dense separation layer and a less dense, more permeable layer. These asymmetric membranes are often chosen for separation applications because they may provide a good combination of permeation and separation. Hollow fibers having walls that are primarily porous and a dense skin or layer on the inner or outer surface of the wall can be used to make such membranes.

A limiting factor in the separation efficiency of asymmetric hollow fibers is the presence of defects or holes in the dense separation layer that nonselectively increase the permeability of fluids, thus decreasing the separation efficiency of the fiber.

U.S. Pat. Nos. 4,717,393 and 4,717,394, both issued to Hayes, disclose semipermeable polyimide gas separation membranes.

U.S. Pat. No. 4,838,900 issued to Hayes teaches aromatic polyimide gas separation membranes.

U.S. Pat. No. 4,871,494 issued to Kesting, et al. describes a process for forming asymmetric gas separation membranes having graded density skins. This process comprises dissolving a hydrophobic polymer in a Lewis acid:base solvent system wherein the Hildebrand parameters of the solvent species and the polymer are within less than 1.5, creating a dope from this solution, forming the dope into an appropriate shape, coagulating the dope, desolvating, washing and drying. According to the patent, the resultant membrane has increased free volume as evidenced by a glass transition temperature greater than the bulk glass transition temperature of the polymer.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. Pat. No. Re. 30,351 issued to Hoehn, et al. discloses aromatic polyimide, polyester, and polyamide gas separation membranes.

Pending U.S. patent application Ser. No. 686,739, the disclosure of which is herein incorporated by reference, describes asymmetric fluoropolymer hollow fibers made by a dry-jet wet-spinning process in which there is an air gap between the hollow fiber die and the coagulation bath.

SUMMARY OF THE INVENTION

The present invention comprises asymmetric hollow fibers made from a fluoropolymer, and a process for making such fibers. The fibers of this invention have a thin, dense separation layer that is essentially defect-free. These fibers are useful for making separation membranes.

In the process of this invention, a fluoropolymer dope is spun into a hollow fiber using a hollow fiber die, a core solvent, preferably comprising water, and a coagulation bath, preferably comprising a water-acetone mixture. Due to solubility, solvent molecular size, and surface tension differences, the outer layer of the fiber does not coagulate quickly enough to form a dense layer, and remains porous. However, the core solvent causes the inner surface of the hollow fiber to coagulate into a thin, dense, defect-free layer.

An object of the present invention is to provide a process for making a hollow fiber having a relatively defect-free separation layer.

Another object of the present invention is to provide a novel asymmetric hollow fiber comprising a fluoropolymer.

A further object of the present invention is to provide an asymmetric hollow fiber in which the oxygen/nitrogen separation factor is relatively high.

Other objects of the present invention will be apparent to those skilled in the art from the following description, drawings, and claims.

DETAILED DESCRIPTION OF THE PREFERRED EMBODIMENTS

Figures 1, 2:
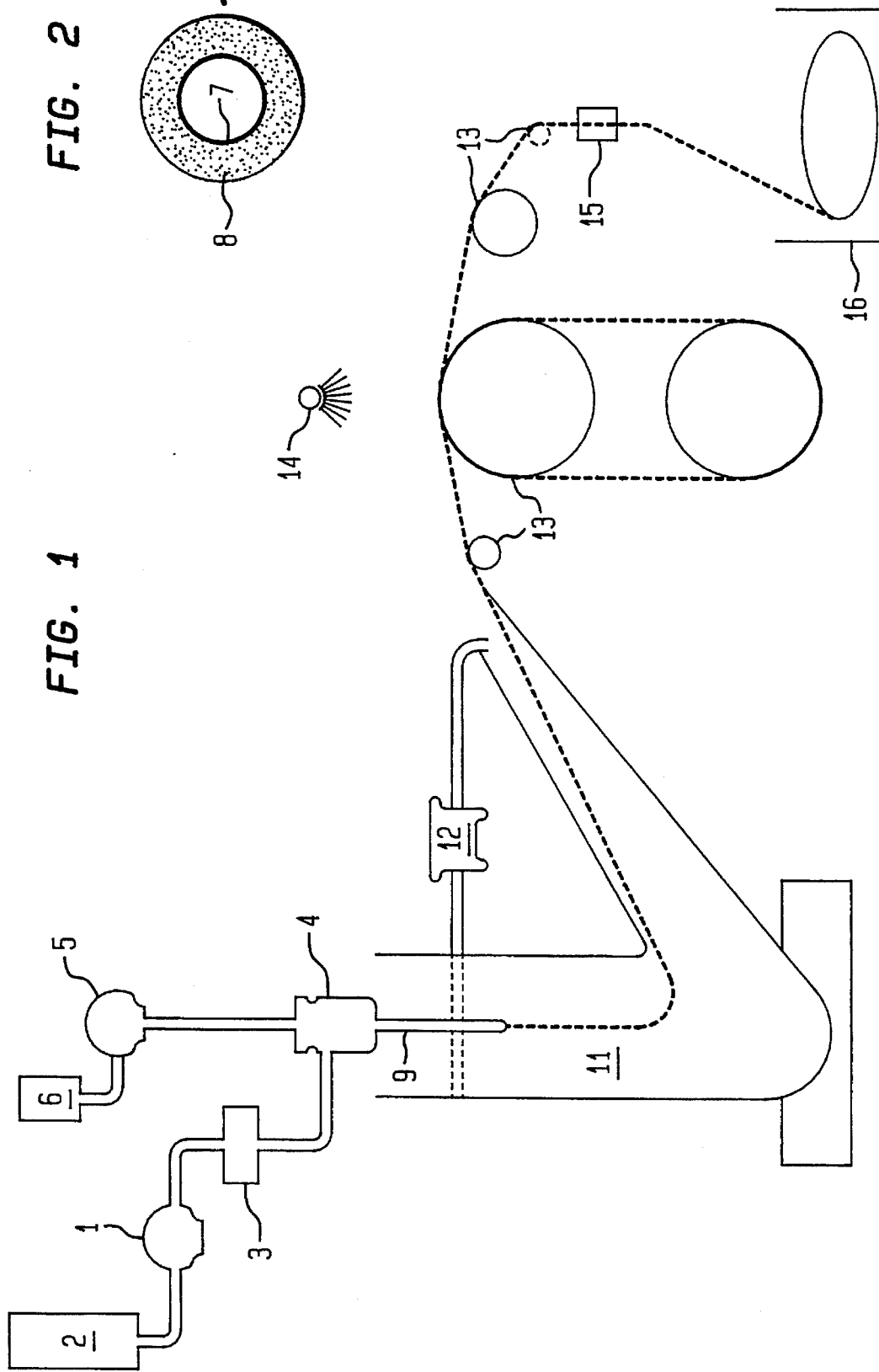
FIG. 1 illustrates one embodiment of an apparatus and a process for making a hollow fiber according to the present invention.
FIG. 2 illustrates a cross-section of a hollow fiber according to the present invention.

FIG. 1 illustrates one preferred embodiment of the present invention. A first pump 1 draws the polymer dope from a dope reservoir 2 through a filter 3 into a die 4. At the same time, a second pump 5 draws core solvent (e.g., water) from a solvent reservoir 6 and into the die 4. The dope enters the die 4 on the side thereof and the core solvent enters at the top thereof. As the polymer dope and core solvent exit the die 4 a hollow fiber 9 is formed.

The hollow fiber 9 enters a coagulation bath 11 comprising an acetone-water mixture that is about 20% acetone by weight in which the temperature is maintained at about 15°–35° C., a temperature controller and pump 12. When the fiber 9 leaves the bath 11, guide rollers 13 lead the hollow fiber 9 past a water spray 14 and then to a fiber take-up device 15 and collector 16.

FIG. 2 illustrates the structure of the fiber 9 made by this process: the inner surface 7 is a thin, dense, uniform layer of fluoropolymer, whereas the remainder of the fiber 8 is porous fluoropolymer.

The polymer dope is made by dissolving a fluoropolymer, e.g. SIXEF™-44 (a polyimide made by the Hoechst Celanese Corporation having repeating units derived from 2,2-bis[4-aminophenyl]hexafluoropropane and 2,2-bis[3,4-dicarboxyphenyl]hexafluoropropane dianhydride), in a solvent composition containing the solvent N,N-dimethyl acetamide ("DMAC"). Other suitable solvents or solvent blends may be used; preferred solvents are those that are easily washed away with water and that form a polymer dope having a constant viscosity over time. DMAC/SIX-EFT™-44 dopes have these desired characteristics.

The spun fiber coagulates in the bath to form a porous fiber having a thin dense layer on its interior surface, due to the rapid coagulating effect of the core solvent, which preferably comprises water, methanol, or mixtures thereof. In fibers according to the present invention, this layer will be virtually defect-free; consequently, the oxygen/nitrogen separation factor of these fibers approach or obtain the theoretical maximum for the polymer, e.g., about 4.7 for SIXEFTM™-44.

Other fluoropolymers may be used in the practice of the present invention, provided that the polymer has a solubility at 25° C. in acetone that is no greater than about 20%. For example, SIXEF-Durene™, a polyimide made by the Hoechst Celanese Corporation having repeating units derived from 2,3,5,6-tetramethyl phenylene diamine and 2,2-bis[3,4-dicarboxyphenyl]hexafluoropropane dianhydride monomers, may be substituted for SIXEF-44™. The fluoropolymer is preferably partially or wholly aromatic, although aliphatic fluoropolymers may be employed.

The polymer content of the dope is sufficient to produce a dope viscosity at 25° C. of at least about 3000 poise, preferably at least about 4000 poise. Preferably, the viscosity at 30° C. is at least about 3700 poise. An undesirably low viscosity will have a detrimental effect on hollow fiber formation. Of particular importance is achieving a sufficient viscosity such that the molecular weight of the polymer molecules is high enough to cause some chain entanglements; these entanglements are important in achieving a good separation factor. A polymer concentration of about 15–50% by weight or more in the dope may be needed to achieve a desirable viscosity; preferably the polymer concentration is at least about 15–35%. However, the percentage needed may be more or less, depending on the fluoropolymer.

The die temperature is typically between about 15° C. and about 50° C., but the optimum temperature depends upon the polymer being spun; those skilled in the art will be able to determine the optimum temperature for a given system.

The core solvent used in the present invention must be one that induces rapid coagulation of the fluoropolymer to produce a uniform dense layer in the fiber core. Water is preferred because it is effective for this purpose, readily available, non-toxic and inexpensive. However, other suitable core solvents may be used, their exact identity depending upon the fluoropolymer used to make the fiber; those skilled in the art will be able to identify suitable equivalents or substitutes for water.

The coagulation solvent used in the bath is preferably a water-acetone mixture, or another mixture of water and a co-solvent, which slowly coagulates the fiber to form a porous structure. The co-solvent should be one in which the polymer is soluble. When water-acetone is used, preferably the mixture is about 10–30% acetone by weight, more preferably about 20%, when the fluoropolymer is SIXEF™-44. For other fluoropolymers, the optimum percentage of acetone may vary. Other suitable coagulation solvents may be used, their exact identity depending upon the fluoropolymer used to make the fiber; those skilled in the art will be able to identify suitable equivalents or substitutes.

Solvent remaining after the fiber leaves the bath may be washed away by a water spray or other washing method known in the art. Conventional means are then used to collect the hollow fiber.

One goal of the process of the present invention is to provide a very thin, dense layer inside the fiber core. This layer is essential to provide an asymmetric fiber that is useful in fluid separations. If this layer is too thick, however, the fiber will not have sufficient permeability. Preferably, the thickness of the dense layer will be less than about 1 micron, more preferably between about 0.1 and about 0.5 micron.

The fibers of the present invention are particularly suitable for use in membranes for separating oxygen from nitrogen. Suitably, the fibers will have a separation factor for these gases of at least about 4, preferably about 4.5 or higher, and more preferably no less than 4.7. The separation factor of the fiber is defined as the ratio of the permeability of oxygen to the permeability of nitrogen. These fibers could also be used in a pervaporation process to remove solvents from liquids.

To achieve these high separation factors, approaching the ideal maximum for the fiber material (the measured separation factor for a flat, dense film), it is necessary that the separation layer is essentially defect-free. Defects or holes in the separation layer reduce the separation power of the layer because the layer is no longer as selective as it otherwise would be. The process of the present invention produces fibers having no significant defects in the separation layer.

The following Examples illustrate several embodiments of the present invention. However, the invention should not be construed as limited to the embodiments illustrated. The Comparative Examples indicate the importance of using appropriate solvents for the core solvent and the coagulation bath to achieve the fibers of this invention.

EXAMPLE I

A polymer dope was prepared using SIXEFTM™-44 polymer having an average molecular weight of 887,000 and DMAC solvent. The polymer and solvent were mixed in a bottle and tumbled overnight to create a dope having 30% solids by weight and a viscosity at 30° C. of 3930 poise.

The dope was spun through a hollow fiber spinneret using water as a core solvent at a jet pressure of 315 psi. The spinneret had an outer diameter of 500 microns and an inner diameter of 350 microns. The fiber exited the spinneret into an 80/20 water/acetone coagulation bath maintained at 25° C.; there was no air gap between the spinneret and the bath. After coagulation, the spun hollow fiber was washed with water at 14° C. to remove residual solvents.

The fiber was dried at room temperature and its dimensions were measured; the outer diameter was 375 microns and the inner diameter was 255 microns. SEM observation showed a dense layer is at the inner layer.

Two gas separation modules were fabricated using the hollow fiber, and these modules were tested for air separation. Module 1 was air pressurized from the shell (outer) side at 100 psi and module 2 was air pressurized from the shell side at 50 psi. The following Table I presents the permeances (units: $10^{-6}$ cc(STP)/sec cm$^2$ cm Hg) and separation factor (ratio of the permeances) for oxygen and nitrogen in each case. The separation factors were in the range of 4.6–4.7, which is essentially ideal, indicating that the inner dense separation layer had virtually no defects.

TABLE I

| MODULE | O₂ PERMEANCE | N₂ PERMEANCE | RATIO |
|---|---|---|---|
| 1 | 28.8 | 6.23 | 4.62 |
| 2 | 38.1 | 8.06 | 4.7 |

EXAMPLE II

A second dope was prepared using the same polymer and solvent as in Ex. I; this dope had a viscosity of 3720 poise. Hollow fibers were made by the same procedure as in Ex. I except that the coagulation bath was maintained at 30° C. One module was made and tested at 50 psi and at 100 psi; the results are presented in Table II.

TABLE II

| PRESSURE | O₂ PERMEANCE | N₂ PERMEANCE | RATIO |
|---|---|---|---|
| 50 psi | 26.8 | 5.7 | 4.7 |
| 100 psi | 26.9 | 5.63 | 4.8 |

COMPARATIVE EXAMPLE I

The same dope and spinning conditions as in Ex. II were used to make hollow fibers except that the inner coagulant was 50/50 DMAC/methanol. SEM data showed that the dense layer was located on the outside of the fiber. On module was made from these fibers and tested at 50 psi (shell side). The oxygen permeance was 10.5 and the nitrogen permeance was 4.16; the ratio or separation factor was 2.52, well below that of the fibers of the present invention. The reason for this result is believed to be that the DMAC/methanol did not induce fast coagulation; furthermore, the molecular size of DMAC is greater than that of water.

COMPARATIVE EXAMPLE II

The same dope and spinning conditions as in Ex. I were used to make hollow fibers except that the coagulant bath was water. Tests indicated very low permeances. SEM pictures indicated that there were two dense layers, one located on the inner surface and one located on the outer surface of the hollow fiber.

Many variations of the present invention not illustrated herein will occur to those skilled in the art. The present invention is not limited to the embodiments illustrated and described herein, but encompasses all the subject matter within the scope of the appended claims.

We claim:

1. An asymmetric hollow fiber for fluid separation having an outer surface and an inner surface, said fiber comprising a fluoropolymer having a solubility at 25° C. in acetone that is no greater than about 20 percent, wherein said inner surface is a dense, essentially defect-free layer and said outer surface is porous, and further wherein said fiber has a separation factor of at least about 4 for oxygen and nitrogen; said fiber made by spinning a dope comprising said fluoropolymer and a solvent from a hollow fiber die using water as a hollow fiber core solvent, and immersing said fiber in coagulation bath comprising a water-acetone mixture, wherein said fiber does not pass through an air gap between said die and said bath.

2. An asymmetric hollow fiber as set forth in claim 1 wherein said fluoropolymer is selected from the group consisting of: a polyimide having repeating units derived from 2,2-bis[4-aminophenyl]hexafluoropropane and 2,2-bis [3,4-dicarboxyphenyl] hexafluoropropane; and, a polyimide having repeating units derived from 2,3,5,6-tetramethyl phenylene diamine and 2,2-bis[3,4-dicarboxyphenyl]hexafluoropropane.

3. An asymmetric hollow fiber as set forth in claim 2 wherein said fluoropolymer dope solvent comprises N,N-dimethyl acetamide.

* * * * *